(No Model.)　　　　　　　　　　　　　　　　2 Sheets—Sheet 1.
J. F. SCHNEIDER.
REEL CARRIER.

No. 481,641.　　　　　　　Patented Aug. 30, 1892.

Witnesses　　　　　　　　　　　　　　　　Inventor
Harry L. Amer.　　　　　　　　　　　　　John F. Schneider.
N. T. Riley　　　　By his Attorneys,
　　　　　　　　　　C. A. Snow & Co.

(No Model.) 2 Sheets—Sheet 2.
J. F. SCHNEIDER.
REEL CARRIER.
No. 481,641. Patented Aug. 30, 1892.
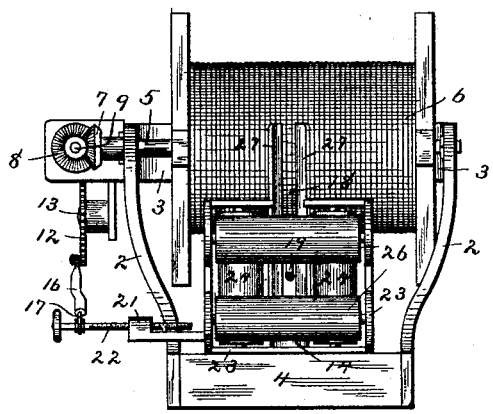
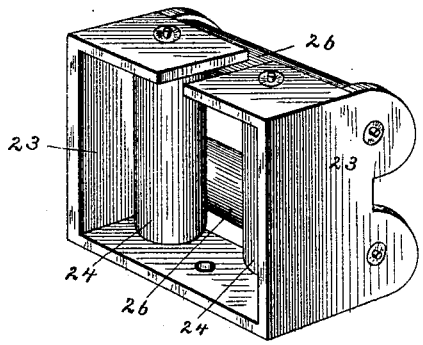
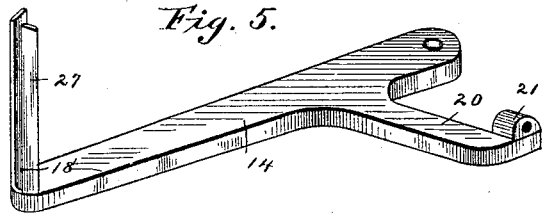
Witnesses
Harry L. Ames
N. J. Riley
Inventor
John F. Schneider.
By his Attorneys,
C. A. Snow & Co.

UNITED STATES PATENT OFFICE.

JOHN F. SCHNEIDER, OF LIVINGSTON, WISCONSIN.

REEL-CARRIER.

SPECIFICATION forming part of Letters Patent No. 481,641, dated August 30, 1892.

Application filed April 11, 1892. Serial No. 428,694. (No model.)

*To all whom it may concern:*

Be it known that I, JOHN F. SCHNEIDER, a citizen of the United States, residing at Livingston, in the county of Grant and State of Wisconsin, have invented a new and useful Reel-Carrier, of which the following is a specification.

The invention relates to improvements in reel-carriers.

The object of the present invention is to provide a simple and inexpensive reel-carrier which will be adapted for rewinding wire from fences and which will guide the wire regularly to a spool and will conform to the size of the spool.

The invention consists in the construction and novel combination and arrangement of parts hereinafter fully described, illustrated in the accompanying drawings, and pointed out in the claims hereto appended.

Figure 1:
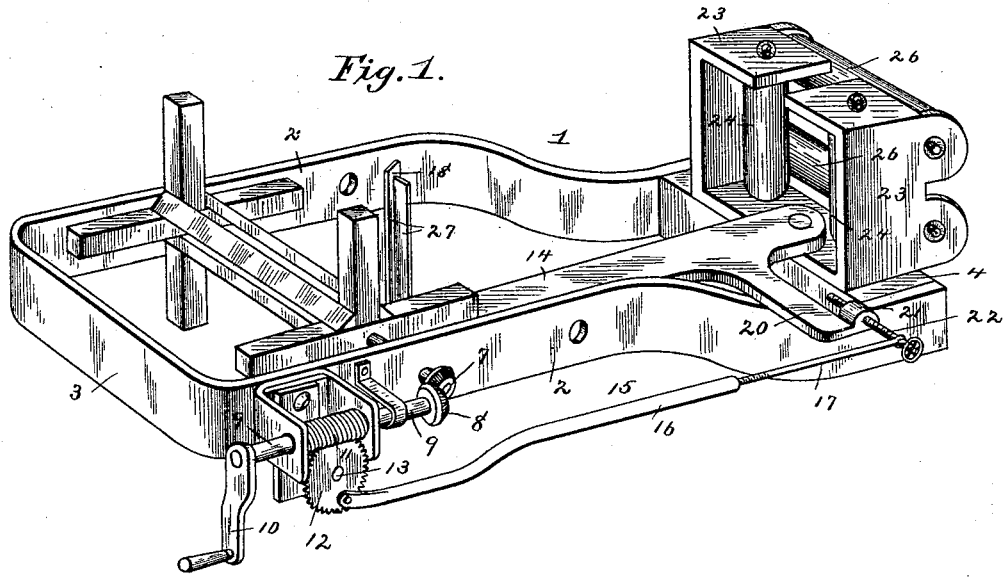
Figure 2:
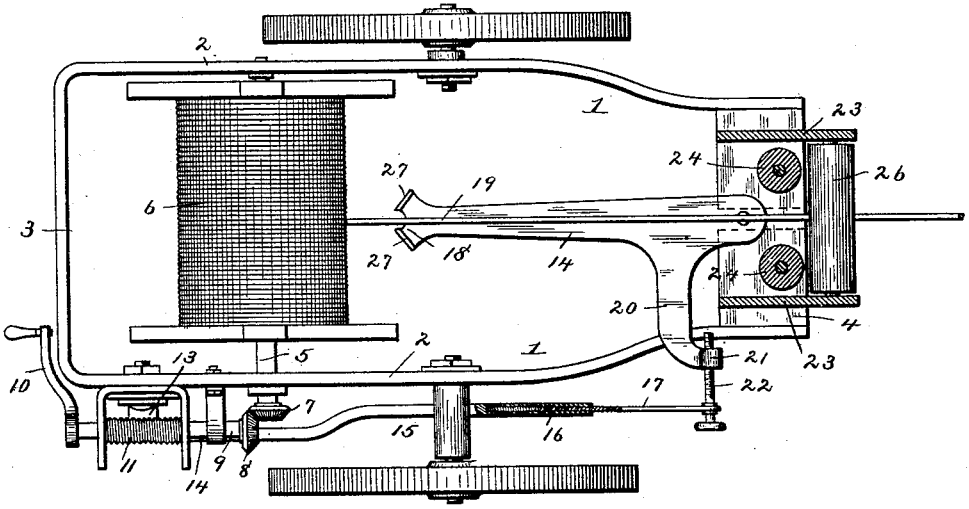

In the drawings, Figure 1 is a perspective view of a reel-carrier constructed in accordance with this invention. Fig. 2 is a plan view, partly in section. Fig. 3 is a front elevation. Fig. 4 is a detail perspective view of the stationary guide. Fig. 5 is a similar view of the oscillating guide.

Like numerals of reference indicate like parts in the several figures of the drawings.

1 designates a frame designed to be mounted upon wheels and composed of side bars 2, a rear bar 3, and a front bar 4, and having journaled in it near its rear end a spool-shaft 5, carrying a spool 6, and having at one end a pinion 7, which meshes with a pinion 8 of a counter-shaft 9, journaled in suitable bearings and arranged at one side of the frame. The counter-shaft is provided at one end with a crank-handle 10 by which the reel is operated, and it is provided with a worm 11, which meshes with a cog-wheel 12, mounted on a stub-shaft 13, and connected with an oscillating guide 14 by a pitman 15. The pitman 15 is composed of two sections 16 and 17, which are adjustably connected together, the section 16 having an interiorly-threaded socket and the section 17 being exteriorly threaded and screwed into the socket. The oscillating wire guide is L-shaped and is fulcrumed at its angle on the front cross-bar of the frame, and is provided at the rear end of its long arm with a vertical fork 18, through which the wire 19 passes, and as the guide 14 oscillates the vertical fork moves back and forth in front of the spool 6 to distribute the wire evenly thereon. The short arm 20 of the oscillating guide is slightly curved and is provided with a threaded opening 21, in which is arranged an adjusting-screw 22, to which the pitman is connected. By means of the adjusting-screw 22 and the adjustable sections of the pitman-rod the stroke of the oscillating guide may be regulated to suit the width of a spool upon which the wire is to be wound. The spool-shaft is detachably journaled in the frame and may be readily removed therefrom to permit one spool to be taken off of it and another spool to be placed on it. The wire 19 is guided to the oscillating guide and delivered centrally to the reel by a stationary guide mounted on the front bar of the frame and consisting of a rectangular casing 23, vertically-disposed rolls 24, arranged at opposite sides of the casing, and horizontally-disposed rolls 26, arranged at the top and bottom of the casing. By this construction the wire is guided without friction to the center of the reel. The vertical guiding-fork or wire-holder of the oscillating guide is open in order to readily receive the wire and is composed of vertical side bars 27, arranged at a slight angle to avoid cutting the wire and presenting smooth faces to the same.

What I claim is—

1. In a reel-carrier, the combination of a frame, a spool-shaft journaled therein and adapted to carry a spool and provided at one end with a pinion, a counter-shaft journaled on the frame and having a pinion meshing with the pinion of the spool-shaft and provided with a worm, a cog-wheel arranged to mesh with the worm, an oscillating guide adapted to deliver wire equally to a spool, and a pitman connected to the cog-wheel and with the guide and oscillating the same, substantially as described.

2. In a reel-carrier, the combination of a frame, a spool-shaft journaled therein, an L-shaped guide pivoted to the frame and having one of its arms arranged in front of the shaft and provided with a vertical wire-holder, its other arm extending transversely of the frame and provided with a threaded opening, an adjusting-screw engaging the opening, and a pitman connected with the adjusting-screw, substantially as described.

3. In a reel-carrier, the combination of a frame, a spool-shaft journaled therein, an L-shaped guide pivoted to the frame and having one of its arms provided with a wire-holder and arranged in front of the shaft, an adjusting-screw mounted on the other arm, and a pitman connected to the screw and composed of adjustable sections, substantially as described.

4. In a reel-carrier, the combination of a frame, a spool-shaft journaled therein, a stationary guide mounted at the front end of the shaft and comprising a casing, vertical rolls journaled therein and arranged at the sides thereof and horizontal rolls arranged at the top and bottom of the casing, and the L-shaped oscillating guide having one arm provided with a wire-holder arranged in front of the shaft and having its other arm connected with suitable motive power, substantially as described.

In testimony that I claim the foregoing as my own I have hereto affixed my signature in the presence of two witnesses.

JOHN F. SCHNEIDER.

Witnesses:
CARL LANGE,
JOHN D. PLAPP.